United States Patent
Emura

(10) Patent No.: US 9,809,261 B2
(45) Date of Patent: Nov. 7, 2017

(54) VEHICLE BODY LATERAL STRUCTURE

(71) Applicant: HONDA MOTOR CO., LTD., Tokyo (JP)

(72) Inventor: Masahiko Emura, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 2 days.

(21) Appl. No.: 14/916,196

(22) PCT Filed: Sep. 4, 2014

(86) PCT No.: PCT/JP2014/073398
§ 371 (c)(1),
(2) Date: Mar. 3, 2016

(87) PCT Pub. No.: WO2015/034022
PCT Pub. Date: Mar. 12, 2015

(65) Prior Publication Data
US 2016/0214662 A1    Jul. 28, 2016

(30) Foreign Application Priority Data
Sep. 4, 2013 (JP) .................................. 2013-183217

(51) Int. Cl.
*B62D 25/02* (2006.01)
*B62D 37/02* (2006.01)
(Continued)

(52) U.S. Cl.
CPC ........... *B62D 37/02* (2013.01); *B62D 25/025* (2013.01); *B62D 25/16* (2013.01); *B62D 35/02* (2013.01)

(58) Field of Classification Search
CPC ...... B62D 37/02; B62D 25/025; B62D 35/02; B62D 25/16
See application file for complete search history.

(56) References Cited

U.S. PATENT DOCUMENTS 4,471,992 A * 9/1984 Matsuura ............... B62D 25/04
296/198
5,462,324 A 10/1995 Bowen et al.
(Continued)

FOREIGN PATENT DOCUMENTS

CN        1188057        7/1998
CN      102001388        4/2011
(Continued)

OTHER PUBLICATIONS

International Search Report dated Nov. 25, 2014, Application No. PCT/JP2014/073398.
Chinese Office Action dated Dec. 27, 2016, 6 pages.

*Primary Examiner* — Glenn Dayoan
*Assistant Examiner* — Melissa A Black
(74) *Attorney, Agent, or Firm* — Rankin, Hill & Clark LLP

(57) ABSTRACT

A vehicle body lateral structure includes a rear strake which is provided with a mounting part for being mounted on a plate-shaped member of a side sill through a rear inner fender, a bolt fastening surface which protrudes from the mounting part by a first protrusion amount toward the front of the vehicle, and a bolt through-hole which opens from the bolt fastening surface toward the front of the vehicle. The rear inner fender includes a cut-out section which has a larger diameter than the bolt fastening surface. A stepped bolt includes in its axial direction, a screw portion which screws into a nut fixed to the plate-shaped member of the side sill, a small-diameter cylindrical portion, and a flange portion which has a smaller diameter than the bolt fastening surface.

6 Claims, 5 Drawing Sheets

(51) Int. Cl.
 *B62D 35/02* (2006.01)
 *B62D 25/16* (2006.01)

(56) References Cited

U.S. PATENT DOCUMENTS

| | | | |
|---|---|---|---|
| 6,102,149 A | 8/2000 | Suzuki et al. |
| 2013/0026790 A1 | 1/2013 | Kakiuchi |

FOREIGN PATENT DOCUMENTS

| | | |
|---|---|---|
| CN | 102822043 | 12/2012 |
| JP | 9-511970 | 12/1997 |
| JP | 10-278856 | 10/1998 |
| JP | 2004-338468 | 12/2004 |
| JP | 2007-90976 | 4/2007 |
| JP | 2009-126321 | 6/2009 |
| JP | 2009-227159 | 10/2009 |
| JP | 2010-269730 | 12/2010 |
| JP | 2012-046000 | 3/2012 |
| JP | 2012-101698 | 5/2012 |
| JP | 2012-189151 | 10/2012 |
| JP | 2012-189152 | 10/2012 |
| JP | 2013-91476 | 5/2013 |
| JP | 2014-43197 | 3/2014 |
| JP | 2014-54957 | 3/2014 |

* cited by examiner

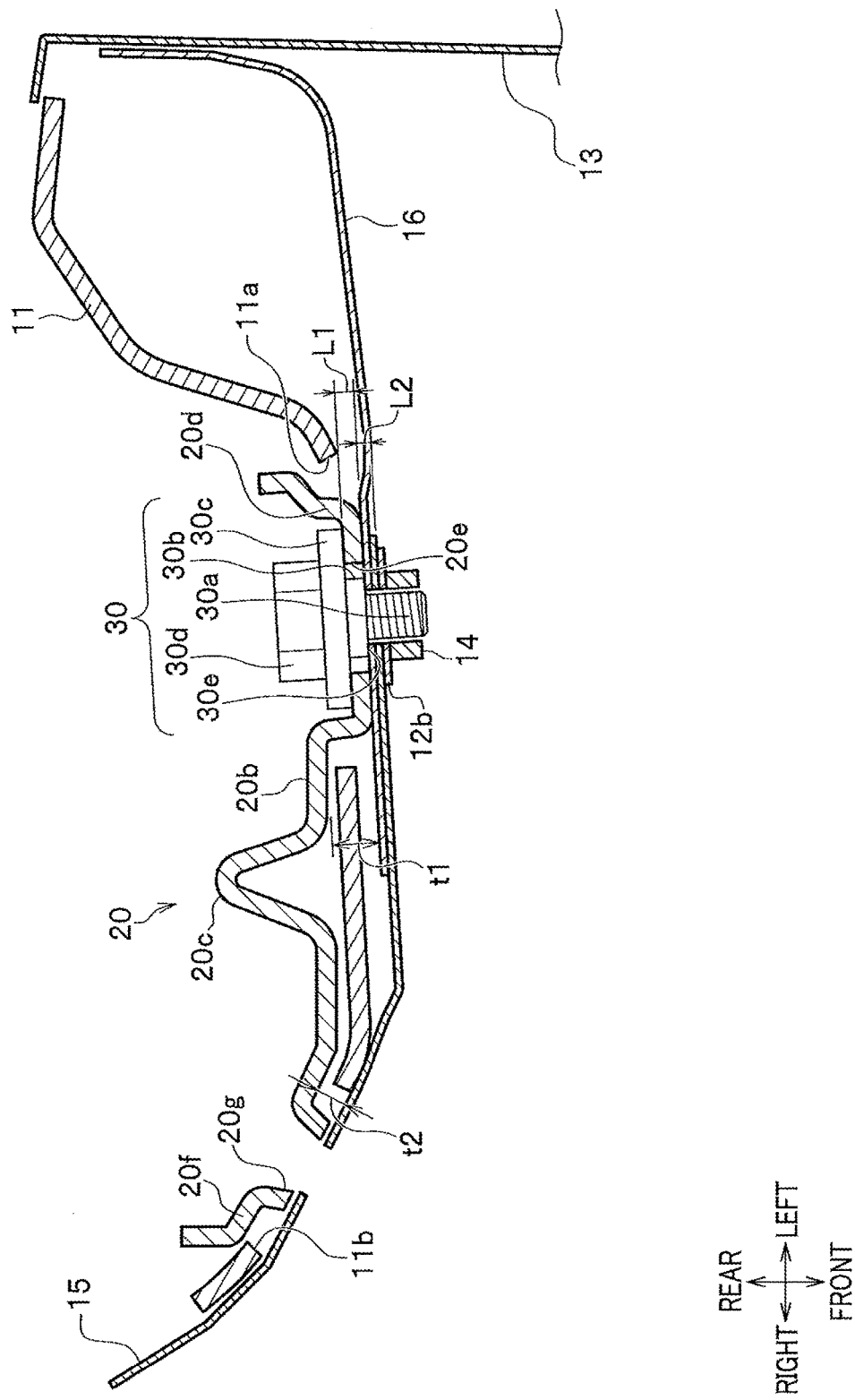

VEHICLE BODY LATERAL STRUCTURE

TECHNICAL FIELD

The present invention relates to a vehicle body lateral structure provided with a strake.

BACKGROUND ART

When a travel wind directly hits on a rotating wheel while a vehicle is traveling, pressure is exerted on the front of the wheel and turbulent flow is caused to allow the air to be disturbed at a lower part of the vehicle in a position posterior to the wheel. Consequently, air resistance and lift force against the wheel are increased to cause problems such as an increase in fuel consumption, uncomfortable ride, and noises. To cope with this, an approach has been adopted in which a strake (flow-rectifying plate) is provided in a position anterior to the wheel to allow a travel wind hitting on the wheel to be rectified to escape to right and left of the wheel to thereby decrease air resistance and lift force against the wheel (see Patent Literature 1).

Patent Literature 1 discloses a vehicle body lower structure, in which a rear strake intended for flow-rectifying effect around a rear wheel house is provided at a lower end in a front part of a rear inner fender of the rear wheel house. The rear strake is fastened and fixed to the rear wheel house and the rear fender, using a bolt and/or a clip.

CITATION LIST

Patent Literature

Patent Literature 1: Japanese Unexamined Patent Application Publication No. 2012-046000 (FIG. 1, FIG. 2)

SUMMARY OF THE INVENTION

Technical Problem

However, the vehicle body lower structure disclosed in Patent Literature 1 has posed problems as described below.

In general, a rear strake and a rear inner fender are shaped in the form of a resin component. Where these resin components are bolted to a vehicle body, crush of the resin components is caused when a tightening torque of a bolt is increased, and the rear strake and the rear inner fender which are resin components expand and deform due to heat to change board thicknesses thereof, thereby posing problems in which the tightening torque of the bolt does not stabilize, or the tightening torque becomes insufficient.

For example, where the tightening torque of the bolt becomes insufficient, problems are posed in which fastening forces of a rear wheel house inner and a rear wheel house outer which are vehicle body components inside the rear inner fender, and of a side sill provided in a position anterior to the wheel house, are decreased to lower rigidity and strength of the vehicle body.

The present invention has been made in view of these problems, and makes it an object thereof to provide a vehicle body lateral structure capable of achieving stability of a tightening torque of a bolt when a rear strake and a rear inner fender are bolted to a vehicle body, and an improvement in rigidity and strength of the vehicle body which is obtained by stabilizing the tightening torque of the bolt.

Solution to Problem

In order to solve the above problems, the present invention provides a vehicle body lateral structure including: a wheel house which is provided on a vehicle body lateral part to house a tire; an inner fender which covers a face of the wheel house, the face being on a side facing the tire; and a strake which is bolted through the inner fender to a wheel house fastening hole provided on the wheel house, wherein the strake includes a mounting part for being mounted through the inner fender to the wheelhouse fastening hole, a bolt fastening surface protruding from the mounting part by a predetermined protrusion amount toward the wheel house and capable of housing a head portion of a bolt, and a bolt through-hole formed on the bolt fastening surface; the inner fender includes a cut-out section at a position corresponding to the bolt fastening surface, the cut-out section having a larger diameter than the bolt fastening surface; and the bolt includes, in an axial direction in a following order, a screw portion which screws into the wheel house fastening hole, the head portion having a larger diameter than the screw portion and a smaller diameter than the bolt through-hole, and a flange portion having a larger diameter than the bolt through-hole and a smaller diameter than the bolt fastening surface, and wherein the strake is bolted to the wheel house fastening hole to allow the bolt fastening surface to be sandwiched between the flange portion and the wheel house and to allow the inner fender to be sandwiched between the mounting part and the wheel house.

According to this configuration, even if the bolt is tightly fastened to the wheel house, the head portion of the bolt allows the bolt fastening surface to be sandwiched between the flange portion and the wheel house with a moderate tightening force. As a result, the bolt fastening surface is prevented from getting crushed, and even if the strake and the inner fender expand and deform due to heat to change board thicknesses thereof, decrease in a tightening torque of the bolt relative to the wheel house is not caused. Consequently, the bolt can be fastened to the wheel house with a high tightening torque, thus allowing rigidity and strength of the vehicle body to be improved.

The vehicle body lateral structure may be configured such that the wheel house has a wheel house inner disposed inside in a vehicle width direction, and a wheel house outer disposed outside in the vehicle width direction, and includes an overlapped section in which an outer end portion in the vehicle width direction of the wheel house inner overlaps an inner end portion in the vehicle width direction of the wheel house outer, and an inner fastening hole provided on the outer end portion in the vehicle width direction of the wheel house inner and an outer fastening hole provided on the inner end portion in the vehicle width direction of the wheel house outer are overlapped to constitute the wheel house fastening hole.

According to this configuration, when the inner fastening hole of the wheel house inner and the outer fastening hole of the wheel house outer are fastened to each other, the bolt for use in mounting the strake can be shared, thus making it possible to decrease the number of components to reduce cost and weight of the vehicle body, and also to decrease assembly man-hours of the vehicle body. Moreover, the strake is mounted on the overlapped section of the wheel house inner and the wheel house outer, at which two components are overlapped to thicken the board thickness as compared with other regions thereof, thus making it possible to improve mounting rigidity and strength of the strake.

The vehicle body lateral structure may be configured such that it further includes a side sill which extends in a front-rear direction of the vehicle body in a position anterior to the wheel house, and the side sill includes a side sill flange portion at a rear end thereof, and the side sill flange portion includes a side sill fastening hole which is fastened by the bolt together with the wheel house fastening hole.

According to this configuration, the wheel house fastening hole and the side sill fastening hole are fastened together by the bolt, thus allowing an efficiency of load transfer to be improved between the wheel house and the side sill which are fastened by the bolt, and allowing rigidity and strength of the vehicle body to be further improved.

The vehicle body lateral structure may be configured such that it further includes a nut into which the screw portion of the bolt screws, the nut being on a front face side of the side sill flange portion and coaxially with the wheel house fastening hole and the side sill fastening hole, and the wheel house inner, the wheelhouse outer, and the side sill flange portion are sandwiched between the nut and the head portion.

According to this configuration, the wheel house inner, the wheel house outer, and the side sill flange portion can be fastened together with the nut with a high tightening torque, thus allowing rigidity and strength of the vehicle body to be improved.

The vehicle body lateral structure may be configured such that the mounting part includes a second mounting part for being mounted through the inner fender to the vehicle body, and the inner fender is sandwiched between the second mounting part and the wheel house.

According to this configuration, the strake is joined at a plurality of fastening points to the wheel house, thus making it possible to be more reliably mounted and supported on the wheel house.

Advantageous Effects of the Invention

The present invention allows a vehicle body lateral structure to be provided which is capable of improving both stability of a tightening torque of a bolt in a resin component and rigidity and strength of a vehicle body such as a wheel house.

BRIEF DESCRIPTION OF DRAWINGS

FIG. 5 is a cross-sectional view showing the mounting structure of the strake on the left side in the vehicle body lateral structure in FIG. 2.

DESCRIPTION OF EMBODIMENTS

Figure 1:
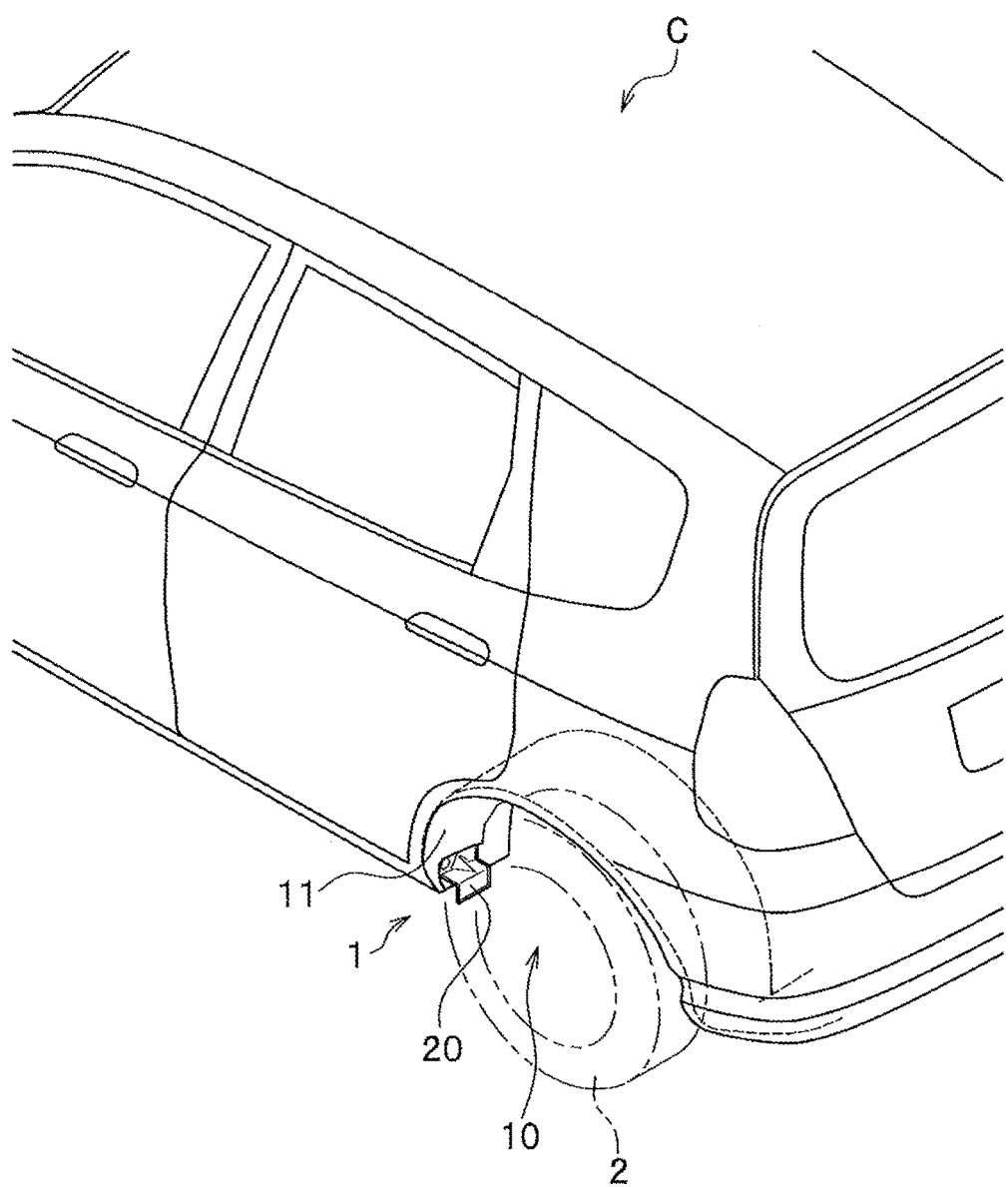
FIG. 1 is a perspective view showing a vehicle body lateral structure according to an embodiment of the present invention, when viewing from behind on the left side.

Hereinafter, embodiments of the present invention will be described in detail with reference to the drawings.

Embodiments

An embodiment of the present invention will be described in detail with reference to FIGS. 1 to 5. In the description below, the same component is given the same reference numeral and duplicate description is omitted. Also, when a direction is described, the description will be given based on "front", "rear", "left", "right", "up" or "down" when viewed from a driver in a vehicle. Note that a vehicle width direction is synonymous with the right-left direction.

Figure 2:
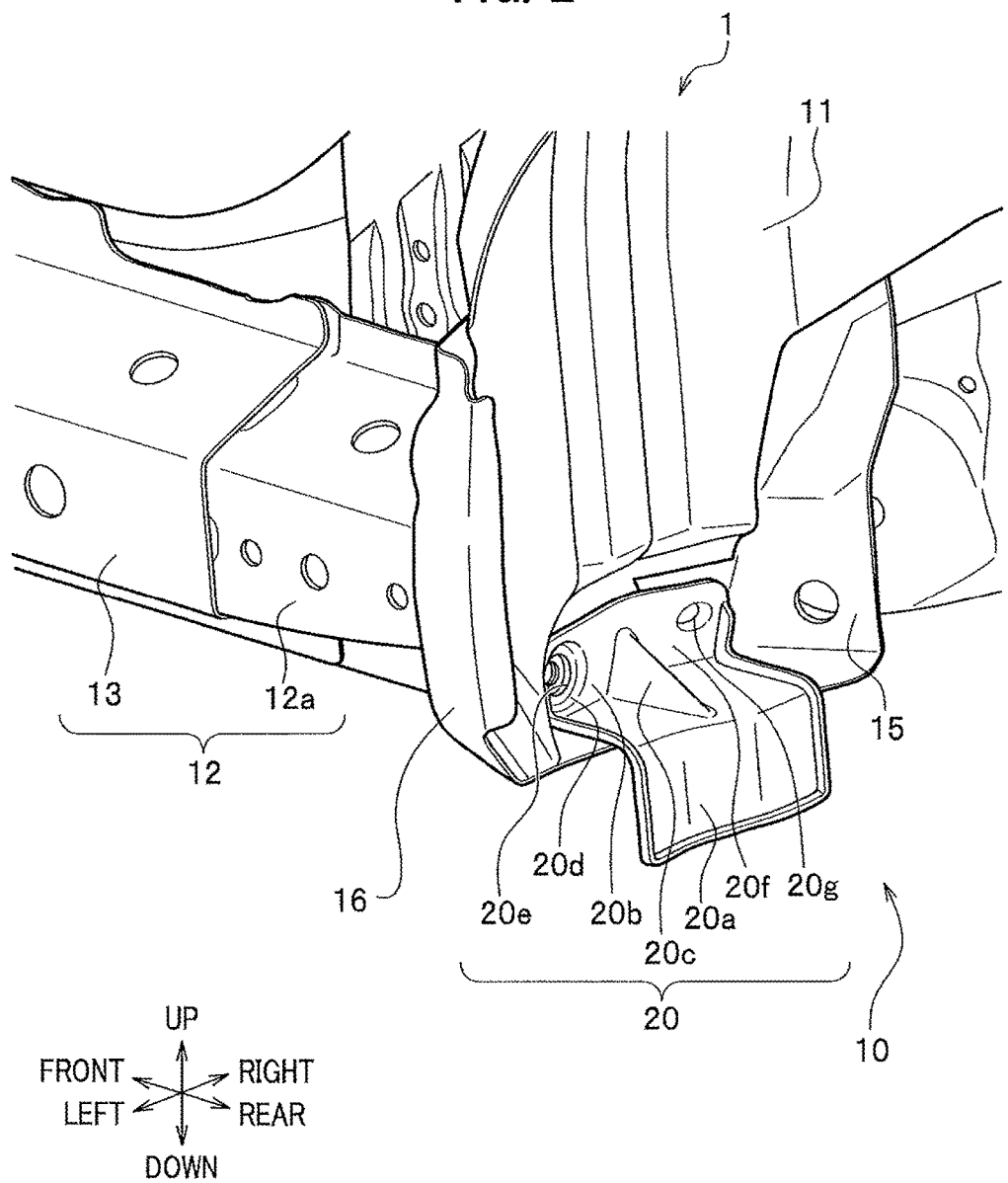
FIG. 2 is a perspective view showing a mounting structure of a strake on the left side in the vehicle body lateral structure according to the present embodiment, when viewing from behind on the left side.
Figure 3:
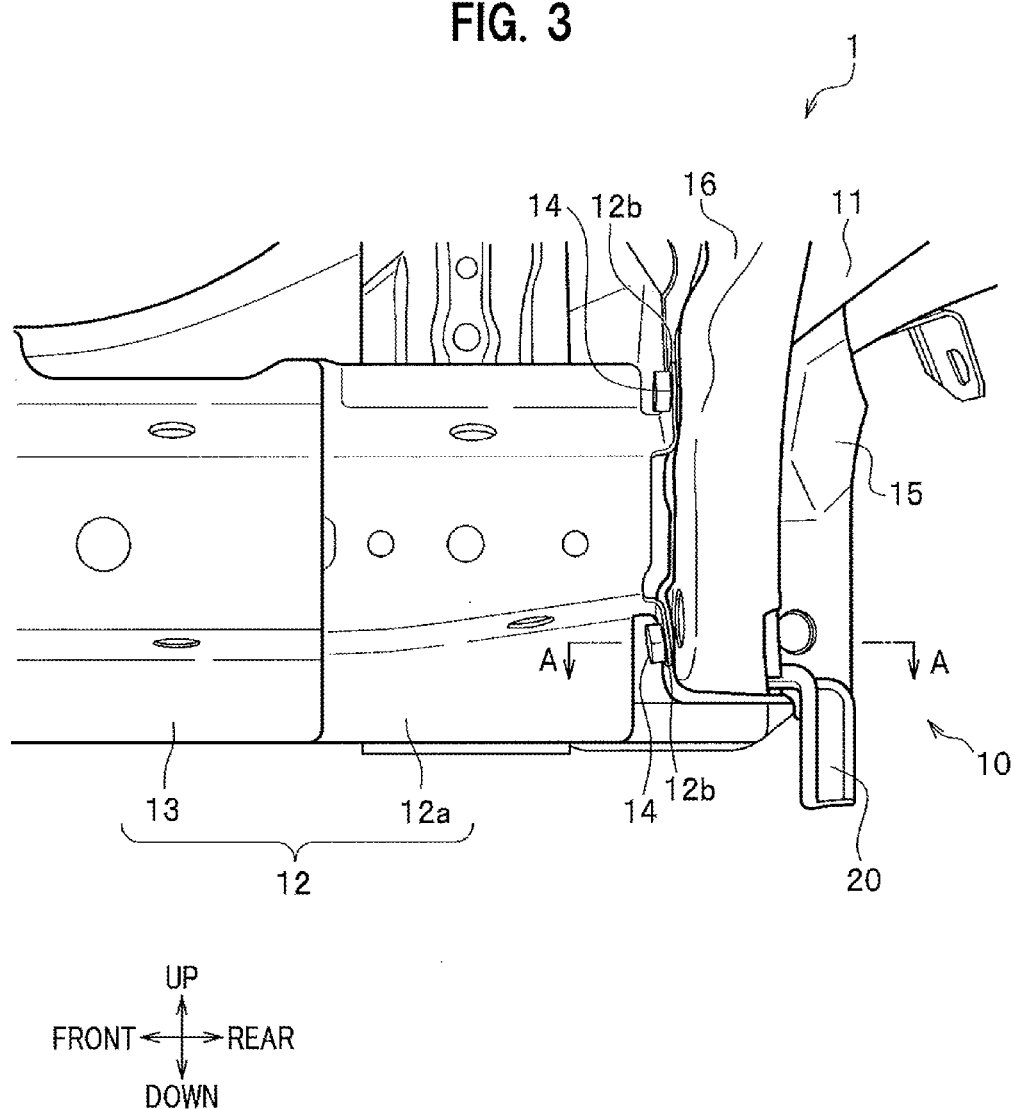
FIG. 3 is a view showing the vehicle body lateral structure in FIG. 2, when viewing from the left side.
Figure 4:
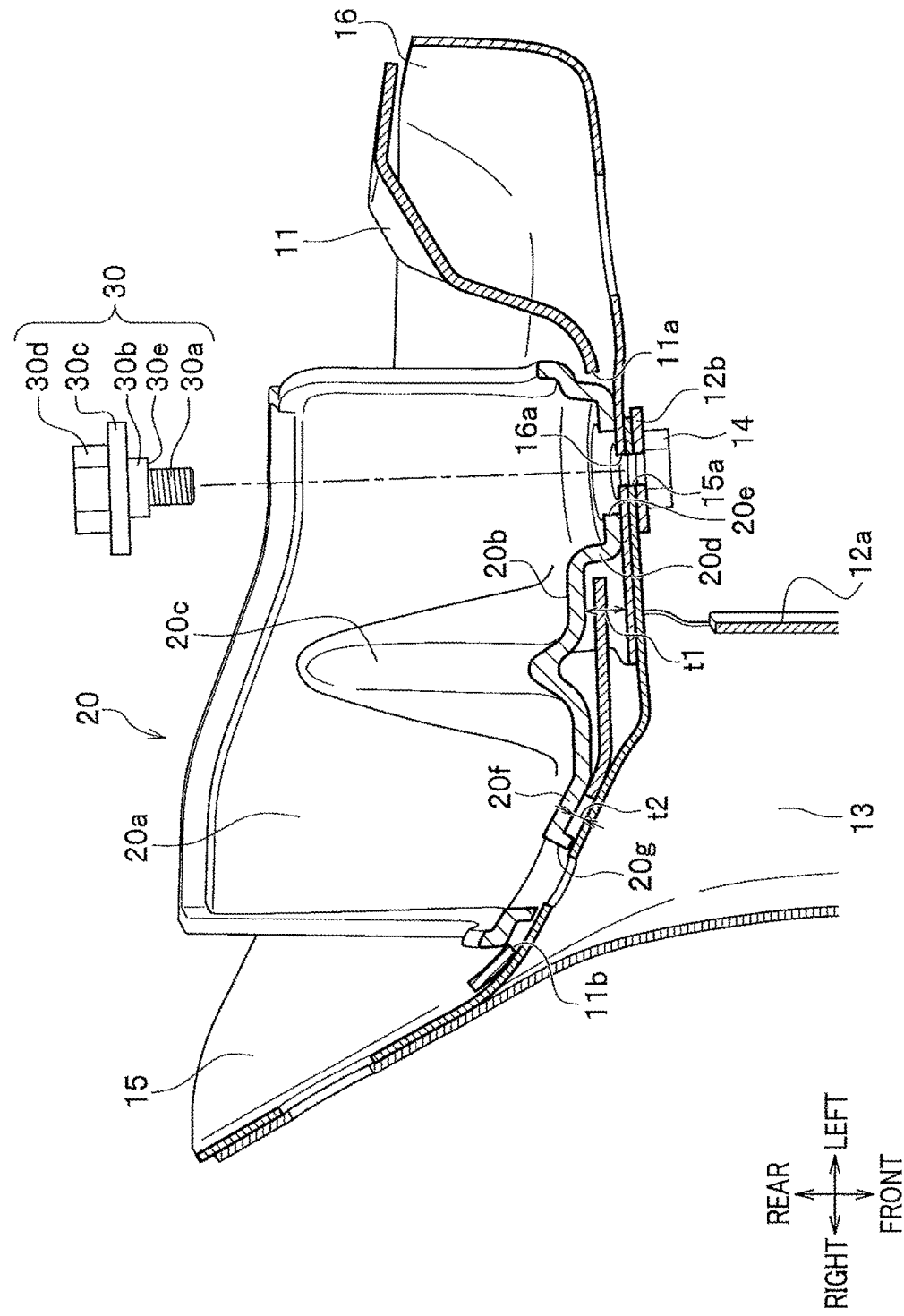
FIG. 4 is a cross-sectional view when viewing from the arrow direction of the line A-A in FIG. 3.

FIG. 1 is a perspective view showing a vehicle body lateral structure according to a first embodiment. FIG. 2 is a perspective view showing a mounting structure of a strake on the left side in the vehicle body lateral structure according to the present embodiment, when viewing from behind on the left side. FIG. 3 is a view showing the vehicle body lateral structure in FIG. 2, when viewing from the left side. FIG. 4 is a cross-sectional view when viewing from the arrow direction of the line A-A in FIG. 3. FIG. 5 is a cross-sectional view showing the mounting structure of the strake on the left side in the vehicle body lateral structure in FIG. 2. Note that the vehicle body lateral structure according to the present embodiment has a symmetric structure, and accordingly, in the description below, a structure on the left side of the vehicle will be described and description on a structure on the right side will be omitted.

As shown in FIG. 1 and FIG. 2, a vehicle C including a vehicle body lateral structure 1 according to the first embodiment is, for example, a car such as an FF (front-engine, front-wheel drive), an FR (front-engine, rear-wheel drive), and a four-wheel drive.

The vehicle body lateral structure 1 forms a lateral part of the vehicle C, and mainly includes a rear wheel house 10 which is provided on a vehicle body lateral part to house a rear tire 2, a rear inner fender 11 which covers a face of the rear wheel house 10, the face being on the side facing the rear tire 2, a side sill 12 (see FIG. 2) which extends in a position anterior to the rear inner fender 11, and a rear strake 20 which is bolted through the rear inner fender 11 to the side sill 12.

As shown in FIGS. 2 to 5, the side sill 12 is a hollow structural frame member which extends in the front-rear direction of the vehicle to constitute part of the vehicle body. The side sill 12 includes a side sill stiffener 12a, and a side sill outer 13 which is composed of a high-strength steel sheet and disposed to cover the exterior of the vehicle body. A plate-shaped member 12b bent in the form of an L-shape outwardly in the vehicle width direction protrudes from a rear end portion of the side sill stiffener 12a (see FIG. 3). A nut 14 is fixed to the plate-shaped member 12b.

The rear wheel house 10 is a semicircular steel member which constitutes part of the vehicle body, and includes a wheel house inner 15 and a wheel house outer 16. The wheel house inner 15 is disposed inside in the vehicle width direction of the rear inner fender 11, and the wheel house outer 16 is disposed outside in the vehicle width direction of the rear inner fender 11.

A bolt fastening hole 15a is formed on the outer end portion in the vehicle width direction of the wheel house inner 15, and a bolt fastening hole 16a is formed coaxially with the bolt fastening hole 15a of the wheel house inner 15, on the inner end portion in the vehicle width direction of the wheel house outer 16. The bolt fastening hole 15a of the wheel house inner 15 and the bolt fastening hole 16a of the wheel house outer 16 are communicated with the nut 14 with the same diameter through the plate-shaped member 12b of the side sill 12.

An overlapped section, in which the outer end portion in the vehicle width direction of the wheel house inner 15 overlaps the inner end portion in the vehicle width direction of the wheel house outer 16, is fastened and fixed to the plate-shaped member 12b by means of a stepped bolt 30.

The overlapped section is bolted to the plate-shaped member 12b to allow strength of the wheel house to be further improved.

The rear inner fender 11 is a resin component which covers a face of the rear wheel house 10, the face being on the side facing the tire, and includes a cut-out section 11a (circular opening in the present embodiment) having a larger diameter than a bolt fastening surface 20d (see FIG. 4 and FIG. 5), and a cut-out section 11b (circular opening in the present embodiment) having a larger diameter than a locating fastening surface 20f (see FIG. 4 and FIG. 5).

The rear strake 20 is a member which is drooped from a lower base of the rear inner fender 11 in a downward direction of the vehicle body to rectify airflow during traveling of the vehicle.

The rear strake 20 is a resin component and includes a strake main body 20a which is bent in the form of an inverse L-shape to droop in the downward direction of the vehicle body from the rear side of the vehicle when viewing in the vehicle width direction, a mounting part 20b which rises in an upward direction of the vehicle body from a front part of the strake main body 20a when viewing in the vehicle width direction, and is for allowing the bent face to be mounted through the rear inner fender 11 to the side sill 12, and a support part 20c which is curved to the upper surface side at the bent position of the strake main body 20a and the mounting part 20b to keep a support stiffness.

The rear strake 20 is bolted by the stepped bolt 30 (see FIG. 4) through the rear inner fender 11 to the nut 14 (see FIG. 4) (wheel house fastening hole) which is connected to the plate-shaped member 12b (vehicle body) in the rear end portion of the side sill 12. Although in the present embodiment, the nut 14 to be bolted is employed as the wheel house fastening hole provided on the rear wheel house 10, a screw bolt not requiring the nut 14 may be employed instead.

Here, in the present embodiment, the rear strake 20 is bolted to the nut 14 connected to the plate-shaped member 12b of the side sill 12 which extends in the front direction of the vehicle in a position anterior to the rear inner fender 11. But, as long as the manner of fastening is one allowing the rear strake 20 to be bolted to the vehicle body, any manner of fastening can be adopted. For example, the rear strake 20 may be bolted to a component other than the side sill 12 as long as the component constitutes part of the vehicle body. Alternatively, the rear strake 20 may be bolted to the rear wheel house 10 to allow the rear wheel house 10 to be fixed to the vehicle body (the rear end portion of the side sill 12, or the like).

<Mounting of the Mounting Part 20b of the Rear Strake 20, the Wheel House Inner 15 and the Wheel House Outer 16, by Means of the Stepped Bolt 30>

As shown in FIG. 4 and FIG. 5, the stepped bolt 30 includes a screw portion 30a which screws into the nut 14, a cylindrical portion 30b (head portion) having a larger diameter than the screw portion 30a and a smaller diameter than a bolt through-hole 20e of the rear strake 20, a flange portion 30c having a larger diameter than the bolt through-hole 20e and a smaller diameter than the bolt fastening surface 20d, and a bolt portion 30d for fastening operation, which are arranged in an axial direction thereof.

The cylindrical portion 30b has an axial length L1. The axial length L1 is set to allow the bolt fastening surface 20d which is a resin component to have moderate tightening at a time of fastening of the bolt.

The bolt fastening surface 20d of the rear strake 20 is sandwiched in a length direction of the cylindrical portion 30b, namely between the flange portion 30c and the wheel house outer 16.

Moreover, the stepped bolt 30 includes a stepped portion 30e which is formed depending on a difference in radial direction between the cylindrical portion 30b and the screw portion 30a. The wheel house inner 15 and the wheel house outer 16 are sandwiched between the stepped portion 30e and the mounting surface of the plate-shaped member 12b to which the nut 14 is fixed. Note that a length L2 between the stepped portion 30e and the mounting surface of the plate-shaped member 12b is determined depending on thicknesses of the wheel house inner 15 and the wheel house outer 16.

When the wheel house inner 15, the wheel house outer 16 and the bolt fastening surface 20d are sandwiched between the stepped bolt 30 and the nut 14 to be fastened by the stepped bolt 30, the wheelhouse inner 15 and the wheel house outer 16 sandwiched between the stepped portion 30e and the mounting surface of the plate-shaped member 12b are tightly fastened with a high tightening torque as in a normal bolt-tightening. On the other hand, the bolt fastening surface 20d sandwiched between the flange portion 30c and the wheel house outer 16 is relatively weakly fastened with a low tightening torque. More specifically, the wheel house inner 15 and the wheel house outer 16 each composed of a metallic member of high rigidity are tightly fastened with a high tightening torque, while the rear strake 20 which is a resin component is moderately fastened with a low tightening torque.

The bolt fastening surface 20d of the rear strake 20 is inserted into the cut-out section 11a of the rear inner fender 11, and the locating fastening surface 20f of the rear strake 20 is inserted into the cut-out section 11b of the rear inner fender 11.

<Mounting of the Rear Inner Fender 11 by Means of the Mounting Part 20b of the Rear Strake 20>

As shown in FIG. 4 and FIG. 5, the mounting part 20b includes the bolt fastening surface 20d which protrudes by a first protrusion amount t1 toward the front of the vehicle and is capable of housing the head portion of the stepped bolt 30; the bolt through-hole 20e (cut-out section) formed on the bolt fastening surface 20d; the locating fastening surface 20f (second mounting part) which is disposed away from the bolt fastening surface 20d and protrudes by a second protrusion amount t2 smaller than the first protrusion amount t1 (t1>t2) toward the front of the vehicle; and a through-hole 20g formed on the locating fastening surface 20f.

The bolt fastening surface 20d protrudes by the first protrusion amount t1 toward the front of the vehicle. The first protrusion amount t1 is for forming a clearance corresponding to a thickness of the rear inner fender 11 and thicknesses of a sealer and a grommet not shown. The bolt fastening surface 20d allows the rear strake 20 and the vehicle body to be fastened together while forming the clearance corresponding to the first protrusion amount t1 between the bolt fastening surface 20d of the rear strake 20 and the plate-shaped member 12b (vehicle body) of the side sill 12.

The locating fastening surface 20f protrudes by the second protrusion amount t2 toward the front of the vehicle. The second protrusion amount t2 is for forming a clearance corresponding to the thickness of the rear inner fender 11. The locating fastening surface 20f allows the rear strake 20 and the vehicle body to be fastened together while forming the clearance corresponding to the second protrusion amount t2 between the locating fastening surface 20f of the rear strake 20 and the plate-shaped member 12b (vehicle body) of the side sill 12.

Although in the present embodiment, two fastening surfaces (the bolt fastening surface 20d and the locating fastening surface 20f) are used for fastening the rear strake 20 and the vehicle body together, the number of fastening surfaces is not limited to two, but may be one or three or more. Where a plurality of fastening surfaces are provided, a protrusion amount of at least one fastening surface is set to be larger than a protrusion amount of other fastening surfaces. This allows the bolt fastening surface 20d having a large protrusion amount to form the clearance corresponding to the thicknesses of the sealer and the grommet and the thickness of the rear inner fender 11 between the rear strake 20 and the vehicle body. Moreover, the locating fastening surface 20f having a small protrusion amount is allowed to locate the rear inner fender 11 with the rear inner fender 11 being securely sandwiched between the rear strake 20 and the vehicle body.

Thus, in the present embodiment, the bolt fastening surface 20d is allowed to sandwich and fasten the rear inner fender 11, the wheel house inner 15 and the wheel house outer 16 between the rear strake 20 and the plate-shaped member 12b (vehicle body), and the locating fastening surface 20f is allowed to sandwich and fasten the rear inner fender 11 alone between the rear strake 20 and the plate-shaped member 12b (vehicle body). The locating fastening surface 20f also functions as a locating component which prevents backlash and fluctuation of the rear strake 20 relative to the bolt fastening surface 20d.

Hereinafter, description will be given of mounting of the rear strake 20 in the vehicle body lateral structure 1 configured as described above.

As shown in FIG. 2 and FIG. 4, the end portion of the wheel house inner 15 and the end portion of the wheel house outer 16 are overlapped each other on the side of the bolt fastening surface 20d of the rear strake 20. Then, the rear inner fender 11 is arranged to allow the cut-out section 11a of the rear inner fender 11 to face the overlapped portion. Then, the rear strake 20 is arranged to allow the bolt fastening surface 20d of the rear strake 20 to be inserted into the cut-out section 11a of the rear inner fender 11, and to allow the locating fastening surface 20f of the rear strake 20 to be inserted into the cut-out section 11b of the rear inner fender 11. The strake main body 20a of the rear strake 20 is brought into a state drooped in the downward direction of the vehicle body.

As shown in FIG. 4 and FIG. 5, the screw portion 30a of the stepped bolt 30 is inserted, from the rear side of the vehicle, into the bolt through-hole 20e formed on the bolt fastening surface 20d of the rear strake 20, and the bolt portion 30d is turned to allow the stepped bolt 30 to be fastened to the nut 14.

The stepped bolt 30 is fastened to the nut 14 to allow the rear inner fender 11 to be sandwiched between the mounting part 20b and the wheel house outer 16, to allow the bolt fastening surface 20d of the rear strake 20 to be sandwiched between the flange portion 30c of the stepped bolt 30 and the wheel house outer 16, and to allow the wheel house inner 15 and the wheel house outer 16 to be sandwiched between the stepped portion 30e and the plate-shaped member 12b.

After completion of the fastening, the rear inner fender 11 is sandwiched between the mounting part 20b and the wheel house outer 16. The bolt fastening surface 20d has the first protrusion amount t1 which is relatively large, thus allowing the rear inner fender 11 constituted by a resin component to be sandwiched with a moderate force.

Next, as shown in FIG. 4, a bolt (not shown) is inserted, from the rear side of the vehicle, into the through-hole 20g formed on the locating fastening surface 20f of the rear strake 20, allowing the rear strake 20 and the wheel house inner 15 to be sandwiched between the locating fastening surface 20f and the nut 14 (see FIG. 3).

As shown in FIG. 4 and FIG. 5, the locating fastening surface 20f locates and fixes the rear inner fender 11, while forming the clearance which is the second protrusion amount t2 corresponding to the thickness of the rear inner fender 11, between the locating fastening surface 20f of the rear strake 20 and the plate-shaped member 12b (vehicle body) of the side sill 12.

Note that the fastening component in the locating fastening surface 20f is not limited to the bolt, but any fastening component can be adopted. For example, the manner of fastening by rivets may be adopted.

As described above, the vehicle body lateral structure 1 according to the present embodiment includes the rear wheel house 10 which is provided on the vehicle body lateral part to house the rear tire 2; the rear inner fender 11 which covers a face of the rear wheel house 10, the face being on the side facing the rear tire 2; the side sill 12 which extends in the front direction of the vehicle in a position anterior to the rear inner fender 11; and the rear strake 20 which is bolted through the rear inner fender 11 to the side sill 12. The rear strake 20 includes the mounting part 20b for being mounted through the rear inner fender 11 to the nut (wheel house fastening hole) which is connected to the plate-shaped member 12b (vehicle body) in the rear end portion of the side sill 12; the bolt fastening surface 20d which protrudes from the mounting part 20b by the first protrusion amount t1 toward the front of the vehicle and is capable of housing the stepped bolt 30; and the bolt through-hole 20e which opens from the bolt fastening surface 20d toward the front of the vehicle. The rear inner fender 11 includes the cut-out section 11a (cut-out section) having a larger diameter than the bolt fastening surface 20d. The stepped bolt 30 includes in its axial direction, the screw portion 30a which screws into the nut 14 fixed to the plate-shaped member 12b (vehicle body) of the side sill 12; the cylindrical portion 30b having a larger diameter than the screw portion 30a and a smaller diameter than the bolt through-hole 20e; and the flange portion 30c having a larger diameter than the bolt through-hole 20e and a smaller diameter than the bolt fastening surface 20d.

This configuration allows the stepped bolt 30 to have the cylindrical portion 30b (head portion) of the axial length L1, thereby, even if the stepped bolt 30 is tightly fastened to the nut 14, allowing the bolt fastening surface 20d of the rear strake 20 to be sandwiched with a moderate tightening force between the flange portion 30c of the stepped bolt 30 and the wheel house outer 16. Moreover, the wheel house inner 15 and the wheel house outer 16 are sandwiched between the plate-shaped member 12b (vehicle body) and the stepped portion 30e formed in the radial direction between the cylindrical portion 30b and the screw portion 30a. Accordingly, even if the stepped bolt 30 is tightly fastened to the nut 14, the bolt fastening surface 20d is prevented from getting crushed because a space between the stepped bolt 30 and the wheel house 10 is determined by the axial length L1 of the cylindrical portion 30b (head portion). Moreover, even if the bolt fastening surface 20d expands due to heat, the stepped bolt 30 is prevented from loosening.

In the conventional art, where resin components are tightened by means of bolts, crush of the resin components is caused when a tightening torque of a bolt is increased, and board thicknesses are changed due to heat expansion and the like of the resin components, thereby posing problems in which the tightening torque of the bolt does not stabilize (or becomes insufficient). On the contrary, in the present embodiment, the bolt fastening surface 20d is sandwiched with a moderate tightening force, and accordingly, even if the rear strake 20 and the rear inner fender 11 which are resin components are tightened by means of bolts, decrease in the tightening torque due to crush, heat expansion and the like of the resin components is not caused. On the other hand, the wheel house 10 (the wheel house inner 15 and the wheel house outer 16) can be tightened by means of bolts with a high tightening torque, thus allowing rigidity and strength of the vehicle body to be improved.

Thus, the vehicle body lateral structure 1 has an advantageous effect that, even if the rear strake 20 and the rear inner fender 11 which are resin components are tightened by means of bolts, decrease in the tightening torque due to crush, heat expansion and the like of the resin components is not caused, and an advantageous effect that the wheel house 10 can be tightened by means of bolts with a high tightening torque to allow rigidity and strength of the vehicle body to be kept.

Moreover, in the present embodiment, the rear strake 20 includes the locating fastening surface 20f which is disposed away from the bolt fastening surface 20d and protrudes by the second protrusion amount t2 smaller than the first protrusion amount t1 (t1>t2) toward the front of the vehicle. In addition, the rear strake 20 is joined at two fastening points by means of bolts to the plate-shaped member 12b in the rear end portion of the side sill 12. In this case, the rear strake 20 is mounted parallel to the wheel house inner 15 and the wheel house outer 16, thus not causing disturbance of the air such as encountered in the conventional case where the strake 20 is mounted at a tilt. Therefore, the rear strake 20 can be allowed to provide a desired aerodynamic performance.

Furthermore, in the present embodiment, since the wheel house inner 15 and the wheel house outer 16 are sandwiched between the nut and the stepped portion 30e formed in the radial direction between the cylindrical portion 30b and the screw portion 30a, the wheel house inner 15 and the wheel house outer 16 each composed of a metallic member of high rigidity can be tightly fastened with a high tightening torque.

In addition, in the present embodiment, since the mounting part 20b includes the locating fastening surface 20f for being mounted through the rear inner fender 11 to the plate-shaped member 12b in the rear end portion of the side sill 12, and the rear inner fender 11 is sandwiched between the locating fastening surface 20f and the wheel house 10 (the wheel house inner 15 and the wheelhouse outer 16), the rear strake 20 is joined at two fastening points to the wheel house, thus making it possible to be more reliably mounted and supported on the wheel house.

Although the vehicle body lateral structure according to the above embodiment has been described in detail with reference to the drawings, it goes without saying that the present invention is not limited to the embodiment and thus appropriate modifications are possible within the range not departing from the gist of the present invention.

Although the present embodiment shows, by way of example, the case in which the vehicle body lateral structure is applied to the rear strake arranged at the lower end in the front part of the rear inner fender of the rear wheel house, for example, the vehicle body lateral structure may be applied to a strake arranged at the lower end in the front part of the inner fender of the front wheel house. In this case, the same advantageous effects as the above can be obtained.

REFERENCE SIGNS LIST

1 Vehicle body lateral structure
2 Rear tire
10 Wheel house
11 Rear inner fender
11a Cut-out section
12 Side sill
12a Side sill stiffener
12b Plate-shaped member
14 Nut (Wheel house fastening hole)
15 Wheel house inner
15a Bolt fastening hole (Wheel house fastening hole)
16 Wheel house outer
16a Bolt fastening hole (Wheel house fastening hole)
20 Rear strake
20b Mounting part
20d Bolt fastening surface
20e Bolt through-hole (Cut-out section)
20f Locating fastening surface (Second mounting part)
30 Stepped bolt
30a Screw portion
30b Cylindrical portion (Head portion)
30c Flange portion

The invention claimed is:

1. A vehicle body lateral structure comprising:
   a wheel house which is provided on a vehicle body lateral part to house a tire;
   an inner fender which covers a face of the wheel house, the face being on a side facing the tire; and
   a strake which is bolted through the inner fender to a wheel house fastening hole provided on the wheel house, wherein
   the strake includes a mounting part for being mounted through the inner fender to the wheel house fastening hole, a bolt fastening surface protruding from the mounting part by a predetermined protrusion amount toward the wheel house and capable of housing a head portion of a bolt, and a bolt through-hole formed on the bolt fastening surface;
   the inner fender includes a cut-out section at a position corresponding to the bolt fastening surface, the cut-out section having a larger diameter than the bolt fastening surface; and
   the bolt includes, in an axial direction in a following order, a screw portion which screws into the wheel house fastening hole, the head portion having a larger diameter than the screw portion and a smaller diameter than the bolt through-hole, and a flange portion having a larger diameter than the bolt through-hole and a smaller diameter than the bolt fastening surface, and wherein
   the strake is bolted to the wheel house fastening hole to allow the bolt fastening surface to be sandwiched between the flange portion and the wheel house and to allow the inner fender to be sandwiched between the mounting part and the wheel house.

2. The vehicle body lateral structure according to claim 1, wherein
   the wheel house has a wheel house inner disposed inside in a vehicle width direction, and a wheel house outer disposed outside in the vehicle width direction, and includes an overlapped section in which an outer end portion in the vehicle width direction of the wheel house inner overlaps an inner end portion in the vehicle width direction of the wheel house outer, and wherein
an inner fastening hole provided on the outer end portion in the vehicle width direction of the wheel house inner and an outer fastening hole provided on the inner end portion in the vehicle width direction of the wheel house outer are overlapped to constitute the wheel house fastening hole.

3. The vehicle body lateral structure according to claim 1, further comprising
a side sill which extends in a front-rear direction of the vehicle body in a position anterior to the wheel house, wherein
the side sill includes a side sill flange portion at a rear end thereof, and
the side sill flange portion includes a side sill fastening hole which is fastened by the bolt together with the wheel house fastening hole.

4. The vehicle body lateral structure according to claim 3, further comprising
a nut into which the screw portion of the bolt screws, the nut being on a front face side of the side sill flange portion and coaxially with the wheel house fastening hole and the side sill fastening hole, wherein
the wheel house inner, the wheel house outer, and the side sill flange portion are sandwiched between the nut and the head portion.

5. The vehicle body lateral structure according to claim 1, wherein
the mounting part includes a second mounting part for being mounted through the inner fender to the vehicle body, and
the inner fender is sandwiched between the second mounting part and the wheel house.

6. The vehicle body lateral structure according to claim 2, further comprising
a side sill which extends in a front-rear direction of the vehicle body in a position anterior to the wheel house, wherein
the side sill includes a side sill flange portion at a rear end thereof, and
the side sill flange portion includes a side sill fastening hole which is fastened by the bolt together with the wheel house fastening hole.

* * * * *